United States Patent
Bancroft (10) Patent No.: US 9,528,642 B2
(45) Date of Patent: Dec. 27, 2016

(54) METHODS OF USING COUPLINGS WITH PROJECTIONS HAVING ANGULARLY ORIENTED SURFACE PORTIONS

(71) Applicant: VICTAULIC COMPANY, Easton, PA (US)

(72) Inventor: Philip W. Bancroft, Belvidere, NJ (US)

(73) Assignee: Victaulic Company, Easton, PA (US)

( * ) Notice: Subject to any disclaimer, the term of this patent is extended or adjusted under 35 U.S.C. 154(b) by 79 days.

(21) Appl. No.: 14/528,706

(22) Filed: Oct. 30, 2014

(65) Prior Publication Data

US 2015/0052733 A1    Feb. 26, 2015

Related U.S. Application Data

(62) Division of application No. 13/300,756, filed on Nov. 21, 2011, now abandoned.

(51) Int. Cl.
*F16L 21/06* (2006.01)
*F16L 23/08* (2006.01)
*F16L 17/04* (2006.01)

(52) U.S. Cl.
CPC .............. *F16L 21/06* (2013.01); *F16L 17/04* (2013.01); *F16L 21/065* (2013.01); *F16L 23/08* (2013.01); *Y10T 29/49872* (2015.01); *Y10T 29/49947* (2015.01); *Y10T 29/49963* (2015.01)

(58) Field of Classification Search
CPC ... F16L 21/065; F16L 23/08; Y10T 29/49947; Y10T 29/49963; Y10T 29/49872
See application file for complete search history.

(56) References Cited

U.S. PATENT DOCUMENTS

| | | |
|---|---|---|
| 1,331,986 A | 2/1920 | Griffin |
| 1,994,361 A | 3/1935 | Johnson |
| 2,028,182 A | 1/1936 | Barnickol |
| 2,230,287 A | 2/1941 | Curtis |
| 2,428,189 A | 9/1947 | Wolfram |
| 2,464,416 A | 3/1949 | Raybould |
| 2,473,046 A | 6/1949 | Adams |
| 2,473,102 A | 6/1949 | Krooss |
| 2,486,120 A | 10/1949 | Coltosi |

(Continued)

FOREIGN PATENT DOCUMENTS

| | | |
|---|---|---|
| EP | 2282096 A1 | 2/2011 |
| GB | 2243659 A | 11/1991 |

(Continued)

OTHER PUBLICATIONS

Victaulic IPS Carbon Steel Pipe Grooved Couplings, Style 07 Zero Flex® Rigid Coupling (2 pages); Apr. 1999.

(Continued)

*Primary Examiner* — Jermie Cozart
(74) *Attorney, Agent, or Firm* — Ballard Spahr LLP (57) ABSTRACT

A mechanical coupling for joining pipe elements has segments joined end to end, each segment having projections with surface portions oriented angularly with respect to other surface portions to serve as a guide for the insertion of pipe elements between the segments when arranged in spaced apart relation around a ring gasket. A method of assembling a pipe joint includes engaging the surfaces with ends of the pipe elements and pivoting the segments relative to one another to permit insertion.

19 Claims, 5 Drawing Sheets

(56) References Cited

U.S. PATENT DOCUMENTS

| | | |
|---|---|---|
| 2,821,415 A | 1/1958 | Haven |
| 3,006,663 A | 10/1961 | Bowne |
| 3,015,502 A | 1/1962 | Frost |
| 3,024,046 A | 3/1962 | Frost |
| 3,054,629 A | 9/1962 | Piatek |
| 3,086,797 A | 4/1963 | Webb |
| 3,201,149 A | 8/1965 | Bragg |
| 3,251,615 A | 5/1966 | Shortizzi |
| 3,283,553 A | 11/1966 | Taylor |
| 3,291,506 A | 12/1966 | Blakeley |
| 3,351,352 A | 11/1967 | Blakeley |
| 3,362,730 A | 1/1968 | St. Clair |
| 3,365,730 A | 1/1968 | Chiapetta |
| 3,403,931 A | 10/1968 | Crain |
| 3,695,638 A | 10/1972 | Blakeley |
| 3,756,629 A | 9/1973 | Gibb |
| 3,851,903 A | 12/1974 | Nienhaus et al. |
| 3,977,705 A | 8/1976 | Thiessen et al. |
| 4,114,414 A | 9/1978 | Goodman |
| 4,163,571 A | 8/1979 | Nash |
| 4,289,335 A | 9/1981 | Olbermann |
| 4,311,248 A | 1/1982 | Westerlund et al. |
| 4,391,458 A | 7/1983 | Blakeley |
| 4,408,788 A | 10/1983 | Beukema |
| 4,432,558 A | 2/1984 | Westerlund et al. |
| 4,460,201 A | 7/1984 | McGugan |
| 4,522,433 A | 6/1985 | Valentine et al. |
| 4,601,495 A | 7/1986 | Webb |
| 4,611,839 A | 9/1986 | Rung et al. |
| 4,639,020 A | 1/1987 | Rung et al. |
| 4,643,461 A | 2/1987 | Thau, Jr. et al. |
| 4,702,500 A | 10/1987 | Thau, Jr. et al. |
| 4,915,418 A | 4/1990 | Palatchy |
| 5,018,768 A | 5/1991 | Palatchy |
| 5,058,931 A | 10/1991 | Bowsher |
| 5,149,143 A | 9/1992 | Howell |
| 5,190,324 A | 3/1993 | Bird et al. |
| 5,246,256 A | 9/1993 | Rung et al. |
| 5,249,829 A | 10/1993 | Hendrickson |
| 5,282,654 A | 2/1994 | Hendrickson |
| 5,291,769 A | 3/1994 | Miyano |
| 5,443,581 A | 8/1995 | Malone |
| 5,450,738 A | 9/1995 | Chatterley et al. |
| 5,505,499 A | 4/1996 | Wallbank |
| 5,560,656 A | 10/1996 | Okamura et al. |
| 5,603,508 A | 2/1997 | Dole et al. |
| 5,778,715 A | 7/1998 | Lippka et al. |
| 5,951,066 A | 9/1999 | Lane et al. |
| 6,070,914 A | 6/2000 | Schmidt |
| 6,076,861 A | 6/2000 | Ikeda |
| 6,105,972 A | 8/2000 | Guzowski |
| 6,139,069 A | 10/2000 | Radzik |
| 6,170,884 B1 | 1/2001 | McLennan et al. |
| 6,227,577 B1 | 5/2001 | Ikeda et al. |
| 6,371,684 B2 | 4/2002 | Giesenberg et al. |
| 6,375,228 B1 | 4/2002 | Klemm et al. |
| 6,393,885 B1 | 5/2002 | Cadena |
| 6,565,129 B2 | 5/2003 | Surjaatmadja |
| 6,735,841 B2 | 5/2004 | Steele |
| 6,840,782 B1 | 1/2005 | Borden et al. |
| 7,086,131 B2 | 8/2006 | Gibb et al. |
| 7,090,259 B2 | 8/2006 | Dole |
| 7,144,047 B2 | 12/2006 | Dole |
| 7,296,451 B2 | 11/2007 | Dole |
| 7,401,819 B2 | 7/2008 | Gibb et al. |
| 7,591,055 B2 | 9/2009 | Gibb et al. |
| 7,712,796 B2 | 5/2010 | Gibb et al. |
| 7,722,087 B2 | 5/2010 | Dole et al. |
| 7,726,703 B2 | 6/2010 | Porter et al. |
| 7,988,207 B2 | 8/2011 | Dole et al. |
| D665,056 S | 8/2012 | Cuvo et al. |
| D672,849 S | 12/2012 | Madara et al. |
| D673,248 S | 12/2012 | Dole et al. |
| D674,061 S | 1/2013 | Cuvo et al. |
| 2001/0054820 A1 | 12/2001 | Starita |
| 2003/0062718 A1 | 4/2003 | Radzik |
| 2004/0036291 A1 | 2/2004 | Dole |
| 2005/0003449 A1 | 1/2005 | Sarver et al. |
| 2005/0212284 A1 | 9/2005 | Dole |
| 2005/0212296 A1* | 9/2005 | Dole ............ B21D 17/04 285/420 |
| 2005/0242585 A1 | 11/2005 | Dole et al. |
| 2005/0258641 A1 | 11/2005 | Gibb |
| 2006/0284420 A1 | 12/2006 | Dole |
| 2007/0090646 A1 | 4/2007 | Dole et al. |
| 2008/0284161 A1 | 11/2008 | Dole et al. |
| 2008/0303269 A1 | 12/2008 | Radzik. |
| 2009/0243289 A1 | 10/2009 | Madara et al. |
| 2010/0148493 A1 | 6/2010 | Madara et al. |
| 2010/0289257 A1 | 11/2010 | Madara et al. |
| 2011/0062706 A1 | 3/2011 | Henry |
| 2011/0210546 A1 | 9/2011 | Geese et al. |

FOREIGN PATENT DOCUMENTS

| | | |
|---|---|---|
| JP | 2007278455 A | 10/2007 |
| WO | WO-00/57093 A2 | 9/2000 |
| WO | WO-2007/145995 A2 | 12/2007 |
| WO | WO-2009/102698 A1 | 8/2009 |
| WO | WO-2010/002695 A2 | 1/2010 |
| WO | WO-2010/144298 A1 | 12/2010 |
| WO | WO-2011/102875 A1 | 8/2011 |

OTHER PUBLICATIONS

Victaulic IPS Carbon Steel Pipe Grooved Couplings, Style 77, Standard Flexible Coupling (2 pages); 2003.

Victaulic IPS Carbon Steel Pipe Grooved Couplings, Style HP-70 Rigid Coupling (2 pages); Nov. 1996.

International Search Report and Written Opinion of the International Searching Authority mailed on Feb. 20, 2013 for application PCT/US12/64474, filed on Nov. 9, 2012 and published as WO 2013/078021 on May 30, 2012 (Applicant—Victaulic Co. // Inventor—Bancroft) (11 pages).

Non-Final Office Action issued by the U.S. Patent & Trademark Office on Jun. 28, 2013 for U.S. Appl. No. 13/300,756, filed Nov. 21, 2011 and published as US-2013-0125373-A1 on May 23, 2013 (Inventor—Bancroft // Applicant—Victaulic Co.) (15 pages).

Response to Non-Final Office Action filed on Sep. 17, 2013 for U.S. Appl. No. 13/300,756, filed Nov. 21, 2011 and published as US-2013-0125373-A1 on May 23, 2013 (Inventor—Bancroft // Applicant—Victaulic Co.) (20 pages).

Non-Final Office Action issued by the U.S. Patent & Trademark Office on Nov. 22, 2013 for U.S. Appl. No. 13/300,756, filed Nov. 21, 2011 and published as US-2013-0125373-A1 on May 23, 2013 (Inventor—Bancroft // Applicant—Victaulic Co.) (12 pages).

Amendment and Response to Non-Final Office Action filed on Mar. 24, 2014 for U.S. Appl. No. 13/300,756, filed Nov. 21, 2011 and published as US-2013-0125373-A1 on May 23, 2013 (Inventor—Bancroft // Applicant—Victaulic Co.) (18 pages).

Final Office Action issued by the U.S. Patent & Trademark Office on May 30, 2014 for U.S. Appl. No. 13/300,756, filed Nov. 21, 2011 and published as US-2013-0125373-A1 on May 23, 2013 (Inventor—Bancroft // Applicant—Victaulic Co.) (8 pages).

Applicant Initiated Interview Summary issued by the U.S. Patent & Trademark Office on Aug. 5, 2014 for U.S. Appl. No. 13/300,756, filed Nov. 21, 2011 and published as US-2013-0125373-A1 on May 23, 2013 (Inventor—Bancroft // Applicant—Victaulic Co.) (3 pages).

Extended European Search Report issued by the European Patent Office on May 12, 2015 for application EP 12851307.4, filed on Nov. 9, 2012 and published as EP 2783146 on Oct. 1, 2014 (Applicant—Victaulic Company // Inventor—Bancroft) (4 pages).

* cited by examiner

METHODS OF USING COUPLINGS WITH PROJECTIONS HAVING ANGULARLY ORIENTED SURFACE PORTIONS

CROSS-REFERENCE TO RELATED PATENT APPLICATIONS

This application is a divisional of U.S. patent application Ser. No. 13/300,756, filed Nov. 21, 2011 and entitled "Coupling with Projections Having Angularly Oriented Surface Portions," which is hereby incorporated herein by reference in its entirety and is now abandoned.

FIELD

This invention concerns mechanical couplings for joining pipe elements in end to end relation.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having projections which extend radially inwardly from the housing and engage, for example, the outer surfaces of plain end pipe elements, pipe elements having a shoulder and bead, or circumferential grooves that extend around each of the pipe elements to be joined. Engagement between the projections and the pipe elements provides mechanical restraint to the joint and ensures that the pipe elements remain coupled even under high internal pressure and external forces. The housings define an annular channel or pocket that receives a gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

The projections on prior art couplings typically have arcuate surfaces with a radius of curvature that is substantially matched to the radius of curvature of the outer surface of the pipe element that is to be engaged. For couplings used with grooved pipe elements, the radii of curvature of the arcuate surfaces are smaller than the radii of curvature of the outer surfaces of the pipe elements outside of the grooves so that the arcuate surfaces fit within and engage the grooves.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring seal, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

As evident from the previous description, installation of mechanical pipe couplings according to the prior art typically requires that the technician totally disassemble and reassemble the coupling while handling at least seven individual piece parts (and more when the coupling has more than two segments). Significant time, effort and expense would be saved if the technician could install a mechanical pipe coupling without first totally disassembling it and then reassembling it, piece by piece.

Figure 1:
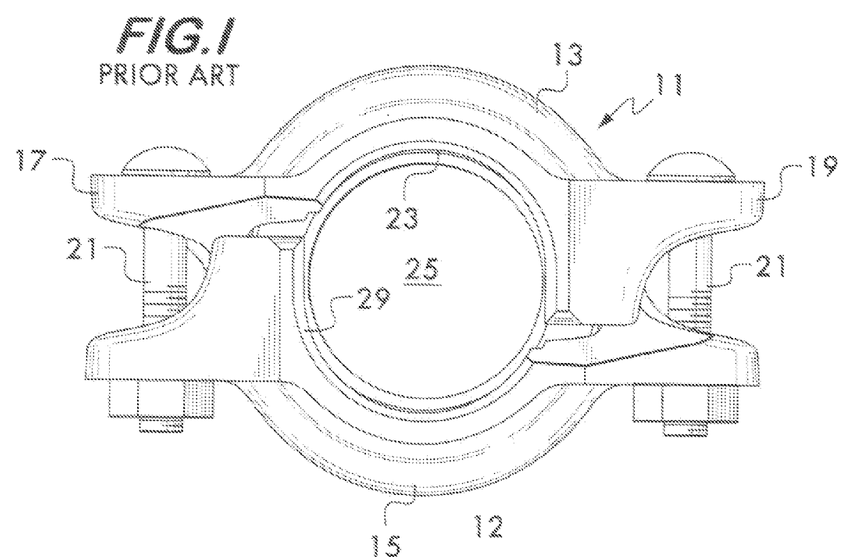
FIG. 1 is an elevational view of an example mechanical pipe coupling.

FIG. 1 shows a coupling 11 having coupling segments 13 and 15. The segments are joined end to end by connection members 17 and 19, the connection members including threaded fasteners 21. The segments 13 and 15 are shown supported in spaced relation from one another on the outer surface of the ring gasket 23 captured between the segments. When the segments are supported in this manner it is possible to insert pipe elements into the central space 25 between the segments without disassembling the coupling. However, there are some drawbacks to this solution to the problem of installing mechanical couplings. Note in particular that there is a limit on the pipe element diameter tolerance variations which can be accepted by coupling 11. If the pipe elements are sufficiently out of round, or if their ends are flared near the maximum degree permitted by specification, it will be difficult to impossible to insert them into the central space 25 between the segments 13 and 15, as the pipe elements will not get past the projections 29 which extend into the central space. Furthermore, the ring gasket itself can resist pipe element insertion when the distortion is not controlled. Many mass produced pipe elements are out of round to some degree and roll grooved pipe elements may be flared to some degree. Use of the coupling 11 therefore places tighter tolerances on these parameters, limiting the pipe elements which can be effectively used with such couplings and making the pipe elements more expensive as they must either be "selected" pipe elements within a permissible tolerance or the tolerances determining manufacturing acceptance must be tighter.

Thus, there is clearly a need for a pipe coupling which can be used with pipe elements having a generous tolerance range on parameters such as out of roundness and flare, yet will allow pipe elements to be inserted reliably without disassembly of the coupling.

SUMMARY

The invention concerns a coupling for joining pipe elements in end to end relation. In one example embodiment, the coupling comprises a plurality of segments joined end to end surrounding a central axis and defining a central space for receiving the pipe elements. At least one of the segments comprises a pair of projections positioned in spaced apart relation on opposite sides of the one segment and extending toward the central axis. At least a portion of each of the projections is engageable with a respective one of the pipe elements. Each of the projections has an arcuate surface facing the central axis. A back wall extends between the projections. The back wall has an arcuate surface facing the central axis.

In another example embodiment of the coupling, at least one of the projections comprises first and second outwardly facing surface portions. The first surface portion is angularly oriented relatively to the second surface portion. The first surface portion may subtend an angle of about 35° to about 60° measured with respect to the central axis. The first surface portion may be centered on a line extending from the central axis and oriented from an angle of about 30° to about 50° measured from a first line extending between a first end of the one segment and a second end of the one segment. The first surface portion may have an orientation angle relative to the second surface portion from about 15° to about 60°. In this example embodiment the one projection may further comprise a third outwardly facing surface portion. The third surface portion is angularly oriented relatively to the second surface portion. The third surface portion subtends an angle of about 35° to about 60° measured with respect to the central axis. The second surface portion is positioned between the first and third surface portions. The third surface portion may be centered on a line extending from the central axis and oriented from an angle of about 30° to about 50° measured from the first line. The third surface portion may have an orientation angle relative to the second surface portion from about 15° to about 60°.

At least one notch may be positioned in at least one of the projections, the notch located at an end of the one segment. In an example embodiment, the at least one notch includes first and second notches positioned on opposite ends of the one segment.

In a particular example embodiment of the coupling according to the invention only a first and a second of the segments are joined end to end surrounding the central axis. In this example, the coupling further comprises a ring gasket positioned between the first and second segments. The ring gasket supports the first and second segments in spaced apart relation sufficient to insert the pipe elements between the segments. The first and second segments have sidewalls from which the projections extend. The back wall and the projections of each said segment cooperate to define a pocket for receiving the ring gasket.

The invention also encompasses a segment, used in a coupling for joining pipe elements in end to end relation. The coupling comprises a plurality of the segments joined end to end surrounding a central axis and defining a central space for receiving the pipe elements. In one example embodiment, the segment comprises a pair of projections positioned in spaced apart relation on opposite sides of the segment. The projections extend toward the central axis. At least a portion of each of the projections are engageable with a respective one of the pipe elements. Each of the projections has an arcuate surface facing the central axis. A back wall extends between the projections. The back wall has an arcuate surface facing the central axis.

In an example embodiment according to the invention, at least one of the projections comprises first and second outwardly facing surface portions. The first surface portion is angularly oriented relatively to the second surface portion. The first surface portion may subtend an angle of about 35° to about 60° measured with respect to the central axis. The first surface portion may be centered on a line extending from the central axis and oriented from an angle of about 30° to about 50° measured from a first line extending between a first end of the one segment and a second end of the one segment. The first surface portion may have an orientation angle relative to the second surface portion from about 15° to about 60°. The projection may further comprise a third outwardly facing surface portion. The third surface portion is angularly oriented relatively to the second surface portion. The third surface portion may subtend an angle of about 35° to about 60° measured with respect to the central axis. The second surface portion is positioned between the first and third surface portions. The third surface portion may be centered on a line extending from the central axis and oriented from an angle of about 30° to about 50° measured from the first line. The third surface portion may have an orientation angle relative to the second surface portion from about 15° to about 60°.

In an example embodiment, the segment may further comprise at least one notch positioned in at least one of the projections, the notch located at an end of the segment. The at least one notch may include first and second notches positioned on opposite ends of the one segment.

The invention also includes a method of coupling first and second pipe elements in end to end relation. In one embodiment, the method includes:

using a pipe coupling having first and second coupling segments attached to one another end to end surrounding a central axis and defining a central space, the coupling segments being supported in spaced apart relation on an elastic ring gasket, the coupling segments having adjustable connection members at each end for drawing the coupling segments toward the central space when the connection members are tightened, at least one of the coupling segments having:

a pair of projections positioned in spaced apart relation on opposite sides of the one coupling segment and extending toward the central axis, at least a portion of each of the projections being engageable with a respective one of the pipe elements, each of the projections having an arcuate surface facing the central axis,     wherein at least one of the projections comprises first and second outwardly facing surface portions, the first surface portion being angularly oriented relatively to the second surface portion, the first surface portion subtending an angle of about 35° to about 60° measured with respect to the central axis;

inserting the first pipe element into the central space from one side of the pipe coupling, the first pipe element engaging and thereby pivoting the coupling segments relatively to one another about an axis passing through the connection members to provide clearance for inserting the first pipe element;

inserting the second pipe element into the central space from an opposite side of the pipe coupling; and tightening the connection members and thereby drawing the coupling segments toward one another and into engagement with the first and second pipe elements to couple them in end to end relation.

The method may further include the step of inserting the second pipe element into the central space from an opposite side of the coupling and engaging and thereby pivoting the coupling segments relatively to one another about the axis passing through the connection members to provide clearance for inserting the second pipe element.

DETAILED DESCRIPTION

Figure 2:
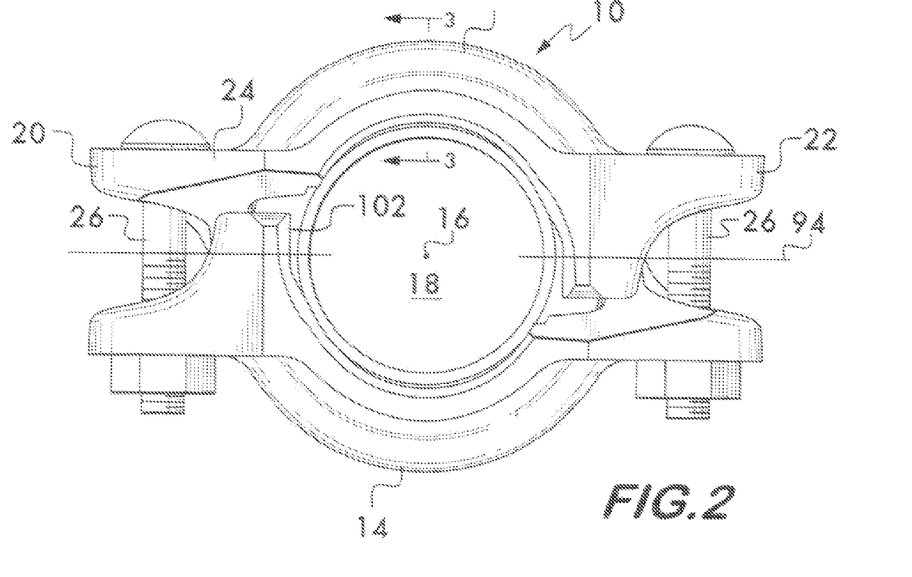
FIG. 2 is an elevational view of an example mechanical pipe coupling according to the invention.

FIG. 2 shows an example embodiment of a coupling 10 according to the invention. Coupling 10 comprises segments 12 and 14 that are joined to one another end to end surrounding a central axis 16 and defining a central space 18. Central space 18 receives the pipe elements to be joined in end to end relation, the longitudinal axis of the pipe elements substantially aligning with the central axis 16. Each of the segments 12 and 14 have connection members 20 and 22 at each end. In this example, the connection members comprise a lug 24 which projects from the segment and receives a threaded fastener 26. Fasteners 26 are adjustably tightenable so as to draw the segments 12 and 14 toward one another and the central axis 16 to engage the pipe elements and form the joint.

Figure 3:
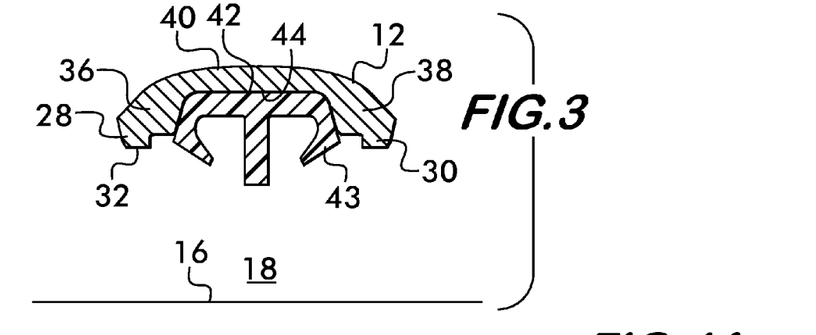
FIG. 3 is a cross sectional view of a segment of an example mechanical pipe coupling according to the invention taken at line 3-3 of FIG. 2.

As shown in cross section in FIG. 3, each segment (segment 12 being shown) has a pair of projections 28 and 30 positioned in spaced apart relation on opposite sides of the segment. The projections extend toward the central axis 16, and at least a portion of each projection is engageable with a respective pipe element to provide mechanical engagement and hold the pipe elements in end to end relation. The projections 28 and 30 engage the outer surface of the pipe elements, which may be a plain surface, a surface forming a circumferential groove, a surface having a raised shoulder, or a shoulder and bead for example. As shown in FIG. 3, each projection has an arcuate surface 32 facing central axis 16.

The segments 12 and 14 also have sidewalls 36 and 38 from which the projections 28 and 30 extend. The sidewalls 36 and 38 are attached to a back wall 40, and together the sidewalls and back wall define a pocket 42. Back wall 40 extends between projections 28 and 30 and has an arcuate surface 44 which faces the central axis 16. Pocket 42 receives a ring gasket 43 (FIG. 3) positioned between the segments 12 and 14 (see FIG. 2) to ensure a fluid-tight seal.

As shown in FIGS. 4A-5B, projections such as 28 and 30 may comprise at least two outwardly facing surface portions 78 and 80. "Outwardly facing" in this context means facing outwardly away from the gasket pocket 42. In this example, surface portion 78 is angularly oriented with respect to surface portion 80.

Figure 4A:
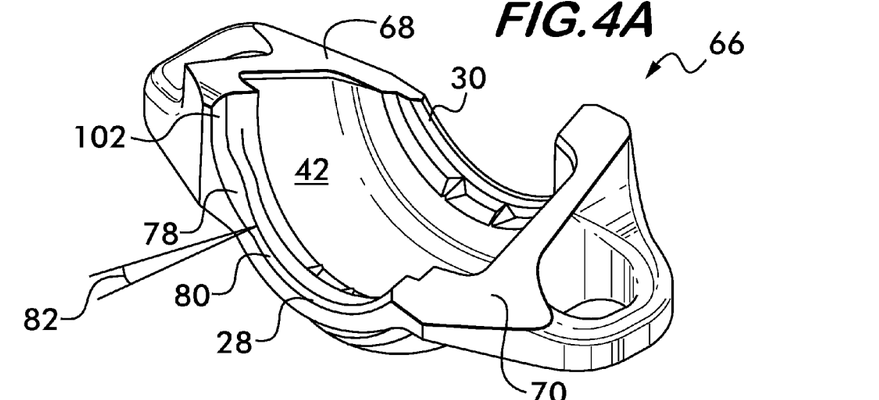
FIGS. 4A and 4B are isometric views of segments of example mechanical pipe couplings according to the invention.
Figure 4B:
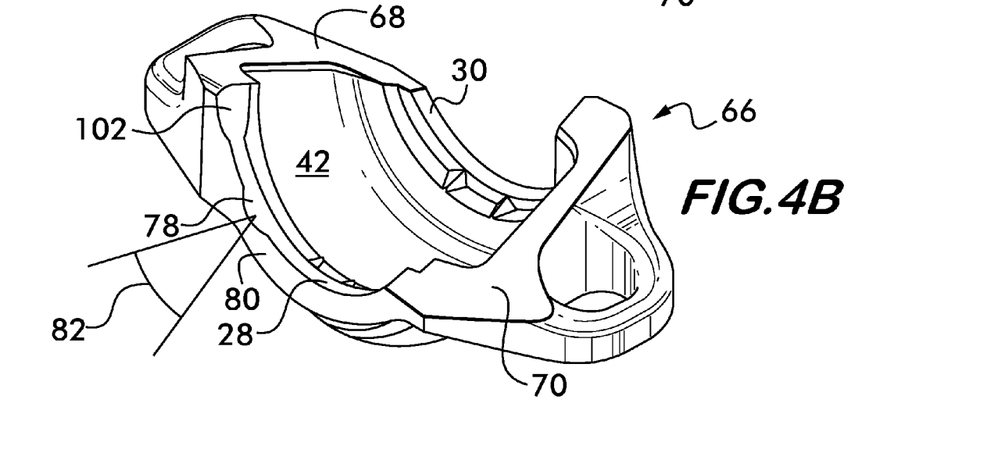
Figure 5A:
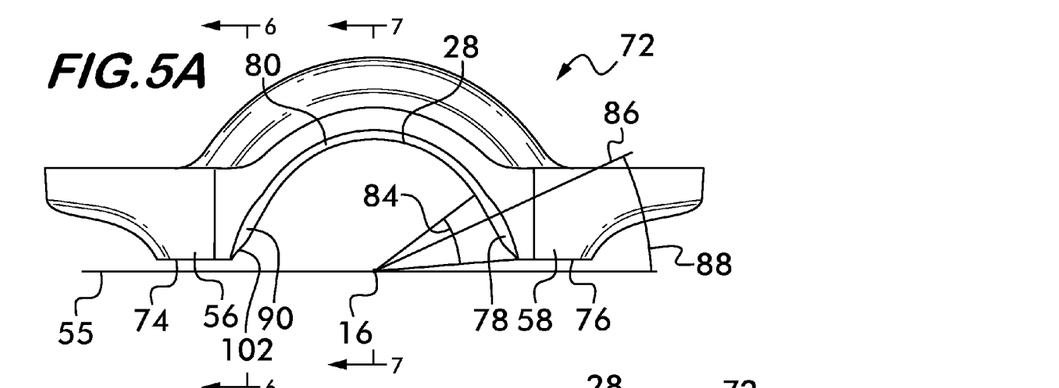
FIGS. 5A and 5B are elevational views of segments of example mechanical pipe couplings according to the invention.
Figure 5B:
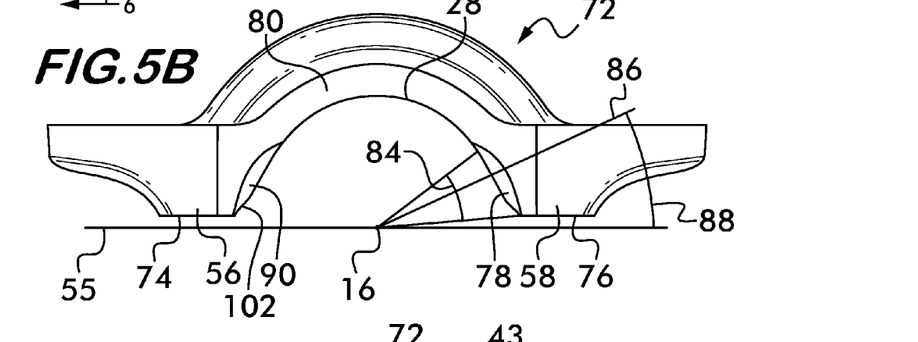

As shown in FIGS. 4A and 5A, surface portion 80 may be angularly oriented relative to the outermost surface of projection 28 (the surface of projection 28 farthest away from gasket pocket 42), thereby defining an angled surface or chamfer extending between the outermost surface of projection 28 and arcuate surface 32 of projection 28 (See FIG. 3). In this example, surface portion 78 may have a relative orientation angle 82 from about 15° to about 45° and may subtend an angle 84 from about 35° to about 60° as measured with respect to the central axis 16. Alternatively, as shown in FIGS. 4B and 5B, surface portion 80 may correspond to the outermost surface of projection 28 such that surface portion 80 does not comprise an angled surface or chamfer extending between the outermost surface of projection 28 and arcuate surface 32 of projection 28. In this example, surface portion 78 may have a relative orientation angle 82 from about 15° to about 60° and may subtend an angle 84 from about 35° to about 60° as measured with respect to the central axis 16.

Surface portion 78 may further be centered on a line 86 extending from the central axis 16, as shown in FIGS. 5A and 5B. Center line 86 of surface portion 78 may have an orientation angle 88 measured from the line 55 which extends between the ends 56 and 58 of the segment 72. Orientation angle 88 may range from about 30° to about 50°. As shown in FIGS. 5A and 5B, segment 72 has a third outwardly facing surface portion 90 which is angularly oriented with respect to surface portion 80. The ranges for the angular orientation of surface portion 90 with respect to surface portion 80 may be the same as for surface portion 78, but the actual orientation angle of surface portion 90 for a particular coupling need not be the same as the orientation angle of surface 78, although for practical designs it is advantageous that all of such surface portions be the same on the segments forming a coupling.

Figure 6:
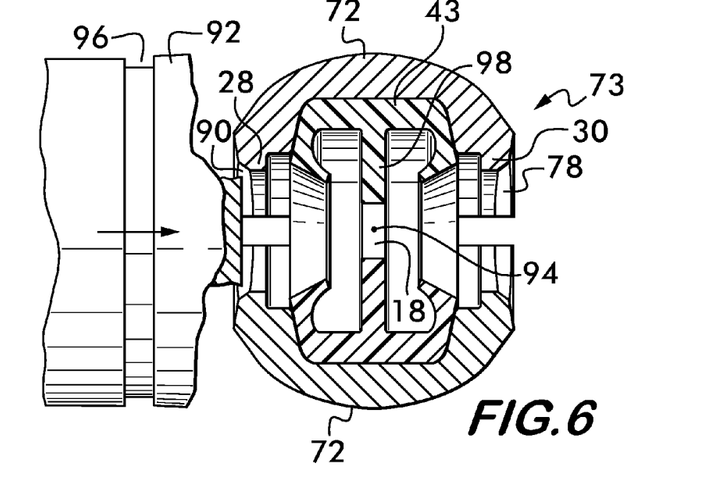
FIGS. 6-9 are longitudinal sectional views illustrating an example method of forming a pipe joint according to the invention. The longitudinal section view depicted in FIG. 6 is taken at line 6-6 of FIG. 5A. The longitudinal section view depicted in FIG. 7 is taken at line 7-7 of FIG. 5A.

The advantage of angularly oriented surface portions 78 and 90 is demonstrated in FIGS. 6-9, which illustrate an example method of coupling pipe elements according to the invention. It is advantageous to have a coupling 73 formed of segments such as 12, 13, 14, 15, 66, or 72 which does not have to be disassembled and then reassembled around the pipe elements to form the joint between them. In the example shown in FIGS. 6-9, the coupling 73 is formed of segments 72, used by way of example. Couplings such as 10, 11 and 73 are regarded as "installation ready" from the factory because, as shown for coupling 10 in FIG. 2 by way of example, the segments for such couplings are attached to one another with threaded fasteners 26 and supported in spaced apart relation on the ring gasket 43 at a sufficient distance to permit pipe elements to be inserted into the central space 18 without disassembling the coupling. FIG. 6 illustrates insertion of a pipe element 92 into central space 18 of coupling 73. Insertion is initiated by contacting the end of the pipe element 92 with the angularly oriented surfaces 90 on projections 28 on segments 72.

Figure 7:
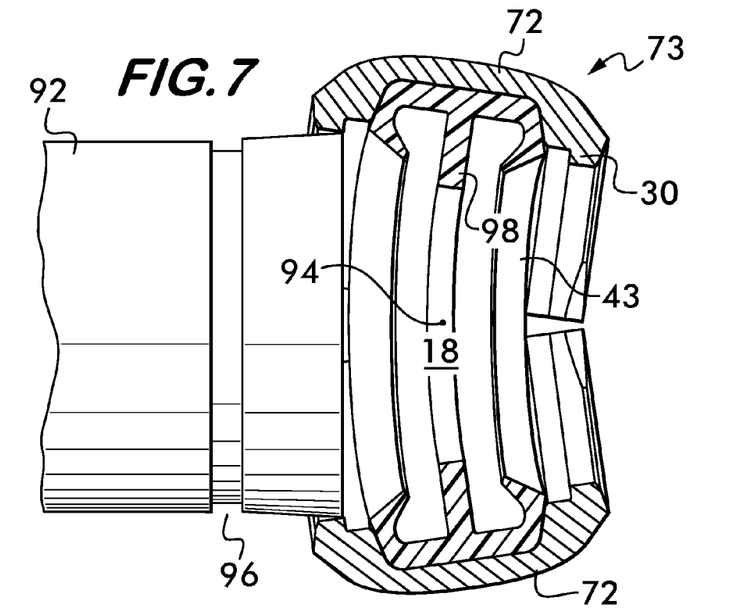
Figure 8:
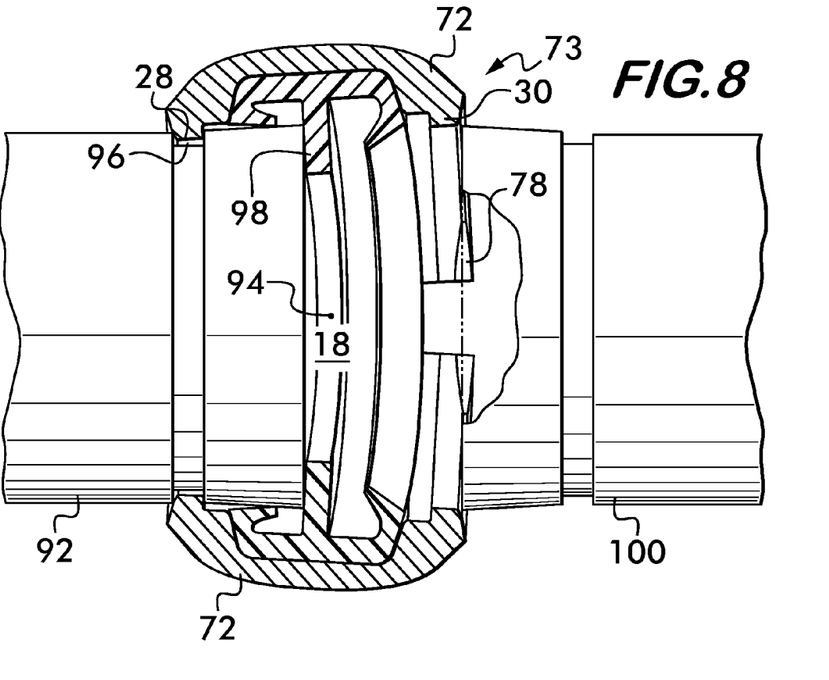
Figure 9:
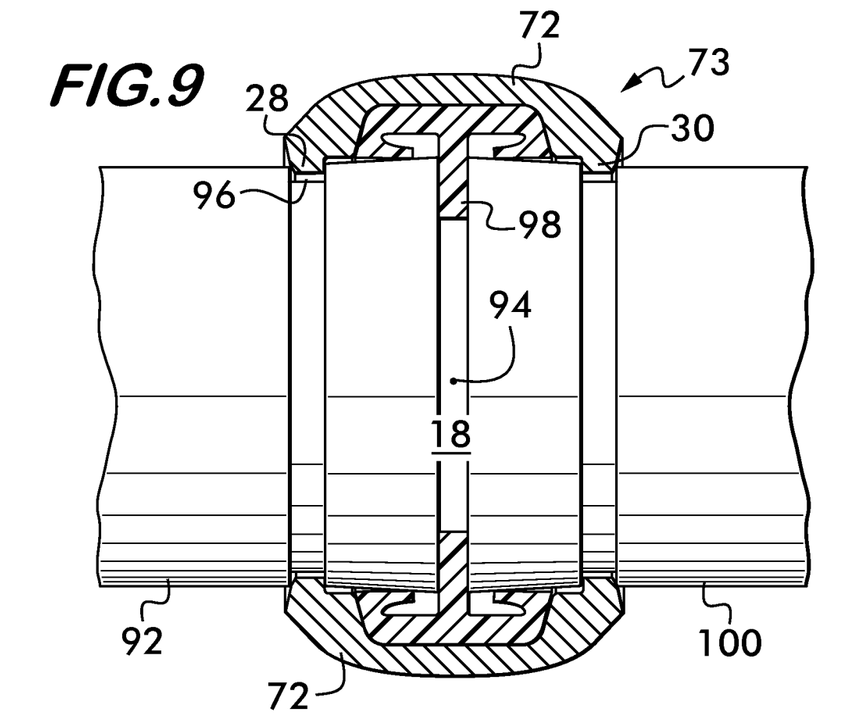

Surfaces 90 facilitate insertion by acting as lead in guides to center the pipe element 92 and also initiate pivotal movement of the segments 72 about an axis 94 passing through the connection members. This pivotal movement of the segments is illustrated in FIG. 7. The ring gasket 43, due to its elastic and resilient properties, acts as a spring which allows the segments 72 to pivot out of the way and admit the pipe element 92 into the central space 18. Once the pipe element 92 is sufficiently engaged with the coupling 10 within the central space 18 the elastic biasing of the ring gasket 43 restores the coupling segments 12 and 14 toward their original relative angular positions. "Sufficient engagement" may be defined, for example, as when the projections 28 align with groove 96 in the pipe element 92, or when the end of the pipe element contacts the gasket stop 98. As shown in FIG. 8, the restoring force provided by the spring action of the ring gasket 43 permits another pipe element 100 to be inserted from the opposite side of coupling 10. Upon insertion into the central space 18, the pipe element 100 contacts angularly oriented surfaces 78 on the projections 30 of segments 72 and the segments pivot about axis 94, out of the way of the pipe element to permit insertion. Once pipe element 100 is sufficiently engaged with the coupling 73, as shown in FIG. 9, the fasteners joining the segments 72 (see also FIG. 2) are tightened to engage the projections 28 and 30 with the outer surface of the pipe elements 92 and 100. In this example the pipe outer surfaces happen to comprise circumferential grooves 96, but other types of pipe elements, such as plain end, shouldered, as well as shoulder and bead pipe elements are also feasible. As shown in FIGS. 2 and 4A-5B, a notch 102 may also be incorporated into the projections 28 and 30 near the ends of the segments 12, 14, 66, and 72 to provide additional clearance for the pipe element insertion. In an example embodiment, first and second notches 102 can be positioned on opposite ends of the segments 12, 14, 66, and 72.

Use of the angularly oriented surface portions 78 and 90 permits pipe elements having flared ends to be received within the coupling 10 by the insertion method. End flare occurs when pipe elements are cold worked, by rolling for example, to form a circumferential groove, and the expanded diameter of the flared end might pose some difficulty to insertion but for the angularly oriented surface portions and the ability of the coupling segments to pivot relatively to one another about axis 94. The notches 102 also help in allowing flared pipe to be used with the joint assembly method according to the invention.

Use of the angularly oriented surface portions 78 and 90 also permits pipe elements that are not axially aligned with the central axis 16 of the coupling 10 to be readily received within the central space 18.

FIGS. 4A-5B illustrate another feature of the coupling according to the invention. FIGS. 4A and 4B depict a rigid coupling segment 66 for use with circumferentially grooved pipe elements. Segment 66 has interfacing surfaces 68 and 70 which have opposite angular orientations with respect to one another. When the fasteners joining such segments together are tightened, the interfacing surfaces 68 and 70 on one segment contact their counterpart surfaces on the mating segment and the segments are forced to pivot about a vertical axis in opposite directions relatively to one another. This causes the projections 28 and 30 to engage the sidewalls of the circumferential groove in the pipe elements and lock them in place so as to provide significant resistance to external bending forces and torque applied to the joint, thereby limiting the relative deflections of the pipe elements. Rigid couplings are disclosed in U.S. Pat. No. 4,611,839 and U.S. Pat. No. 4,639,020, both patents being hereby incorporated by reference.

FIGS. 5A and 5B show a segment 72 of a more flexible coupling. The interfacing surfaces 74 and 76 between the segments 66 and 72 are not angled and when they engage one another they do not cause any relative pivotal movement of the segments. Thus the projections 28 and 30 do not engage the sidewalls of the circumferential groove due to twisting action of the segments which results in a more flexible joint, where the relative deflections of the pipe elements in bending, torsionally and axially, are greater than for the rigid joint (described above) for the same applied loads.

The angularly oriented surfaces described above and claimed herein are applicable to both rigid and flexible couplings. Thus, it is understood that features or elements of the disclosed angularly oriented surfaces that are described or depicted with respect to only one of the segments (66 or 72) or to only one of the projections (28 or 30) are also applicable to, and includable in, the other segment (66 or 72) or the other projection (28 or 30).

Pipe couplings according to the invention permit non-deforming couplings to be used as installation ready couplings and require less energy to install because there is no significant energy expended to deform the couplings when effecting the pipe joint. This corresponds to lower fatigue when manually forming joints with hand tools as well as fewer battery changes when cordless electric power tools are used.

What is claimed is:

1. A method for coupling first and second pipe elements in end to end relation, said method comprising:
using a pipe coupling having first and second coupling segments attached to one another end to end surrounding a central axis and defining a central space, said coupling segments being supported in spaced apart relation on an elastic ring gasket, said coupling segments having adjustable connection members at each end for drawing said coupling segments toward said central space when said connection members are tightened, at least one of said coupling segments comprising:
a pair of projections positioned in spaced apart relation on opposite sides of said one coupling segment and extending toward said central axis, at least a portion of each of said projections being engageable with a respective one of said pipe elements, each of said projections having an arcuate surface facing said central axis,
wherein at least a first of said pair of projections comprises first and second outwardly facing surface portions, said first surface portion being angularly oriented relatively to said second surface portion, said first surface portion subtending an angle of about 35° to about 60° measured with respect to said central axis;
prior to tightening of said connection members, inserting said first pipe element into said central space from one side of said pipe coupling, said first pipe element engaging at least one of said outwardly facing surface portions of said first projection and thereby pivoting said coupling segments relatively to one another about an axis passing through said connection members to provide clearance for inserting said first pipe element;
prior to tightening of said connection members, inserting said second pipe element into said central space from an opposite side of said pipe coupling; and
tightening said connection members and thereby drawing said coupling segments toward one another and into engagement with said first and second pipe elements to couple them in end to end relation.

2. The method according to claim 1, wherein a second of said pair of projections of said one coupling segment comprises first and second outwardly facing surface portions, wherein said step of inserting said second pipe element into said central space from an opposite side of said pipe coupling comprises engaging at least one of said outwardly facing surface portions of said second projection of said one coupling segment with said second pipe element and thereby pivoting said coupling segments relatively to one another about said axis passing through said connection members to provide clearance for inserting said second pipe element.

3. The method according to claim 2, wherein said step of inserting said second pipe element into said central space does not comprise disassembling the pipe coupling.

4. The method according to claim 2, wherein, prior to insertion of said first and second pipe elements into said central space, said first and second segments are positioned in their original relative angular positions, and wherein, following insertion of said first and second pipe elements into said central space and tightening of said connection members, said elastic ring gasket is elastically biased to restore said first and second segments toward their original relative angular positions.

5. The method according to claim 1, wherein said first outwardly facing surface portion is centered on a line extending from said central axis and oriented from an angle of about 30° to about 50° measured from a first line extending between a first end of said one coupling segment and a second end of said one coupling segment.

6. The method according to claim 5, wherein said at least one projection further comprises a third outwardly facing surface portion, said third outwardly facing surface portion being angularly oriented relatively to said second outwardly facing surface portion, said third outwardly facing surface portion subtending an angle along said projection of about 35° to about 60° measured with respect to said central axis, said second outwardly facing surface portion being positioned between said first and third outwardly facing surface portions.

7. The method according to claim 6, wherein said third outwardly facing surface portion is centered on a line extending from said central axis and oriented from an angle of about 30° to about 50° measured from said first line.

8. The method according to claim 6, wherein said third outwardly facing surface portion has an orientation angle relative to said second outwardly facing surface portion from about 15° to about 60°.

9. The method according to claim 1, wherein said first outwardly facing surface portion has an orientation angle relative to said second outwardly facing surface portion from about 15° to about 60°.

10. The method according to claim 1, wherein said first and second segments comprise sidewalls from which said projections extend and a back wall extending between said projections, said sidewalls being attached to said back wall, said sidewalls and said back wall together defining a pocket, said pocket being adapted to receive said elastic ring gasket.

11. The method according to claim 1, wherein said pipe coupling further comprises at least one notch positioned in at least one of said projections of each said segment, each said notch located at an end of one of said segments.

12. The method according to claim 11, wherein said at least one notch comprises first and second notches positioned on opposite ends of said one segment.

13. The method according to claim 1, wherein said step of inserting said first pipe element into said central space does not comprise disassembling the pipe coupling.

14. The method according to claim 1, wherein said first and second pipe elements have respective flared ends.

15. The method according to claim 14, wherein said flared ends of said first and second pipe elements define respective circumferential grooves, and wherein said step of tightening said connection members comprises effecting engagement between said projections of each said coupling segment and a corresponding circumferential groove of said first and second pipe elements.

16. The method according to claim 1, wherein, prior to insertion of said first and second pipe elements into said central space, said first and second pipe elements are not axially aligned with said central axis of said pipe coupling.

17. The method according to claim 1, wherein said pipe coupling is a rigid pipe coupling.

18. The method according to claim 17, wherein each of said first and second coupling segments has respective interfacing surfaces, wherein said interfacing surfaces of each of said coupling segments have opposite angular orientations with respect to one another, and wherein, when said connection members are tightened, said interfacing surfaces of said first coupling segment contact counterpart interfacing surfaces of said second coupling segment and said first and second coupling segments are forced to pivot about a vertical axis in opposite directions relatively to one another.

19. The method according to claim 1, wherein said pipe coupling is a flexible pipe coupling.

* * * * *